Patented Aug. 10, 1937

2,089,323

UNITED STATES PATENT OFFICE 2,089,323

MANUFACTURE OF BENZOSELENOCYANINE DYES

Walter Zeh, Dessau in Anhalt, Germany, assignor to Agfa Ansco Corporation, Binghamton, N. Y., a corporation of New York No Drawing. Application August 25, 1933, Serial No. 686,857. In Germany February 3, 1931

13 Claims. (Cl. 260—44)

My present invention relates to cyanine dyes and more particularly to benzoselenocyanines. It is a continuation in part of my co-pending application Ser. No. 590,772, filed February 3, 1932.

One of its objects is to provide a process of preparing selenazolemethinecyanines. Another object is the selenazolemethinecyanines. Further objects will be seen from the detailed specification following hereafter.

I have found that a selenazolemethinecyanine corresponding with the general formula

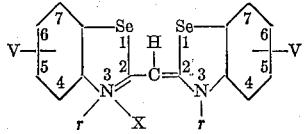

V=H, alkyl, alkoxy, halide, an acylamino group, benzo
r=alkyl
X=halide, perchlorate, para-toluene sulfonate, alkylo-sulfate, nitrate, is suited for sensitizing a silver halide emulsion. The range of sensitivity of an emulsion comprising a short region of individual sensitivity will be increased, or if the region of individual sensitivity will not be increased by addition of the sensitizer its sensitiveness within the region of individual sensitivity may be increased. The sensitizers are therefore well suited for sensitizing silver-chloride emulsions which may be used in color photography.

In the general formula V may represent any position in the benzene nuclei, however, the 5 and 6 position and the 5' and 6' position are preferred. V may be an alkyl, such as methyl, ethyl, etc. or an alkoxy group, for instance, a methoxy or an ethoxy group, or halide or benzo. r may be alkyl, for example methyl or ethyl. X can be any suitable anion, for instance, a halide, paratoluene sulfonate, alkylosulfate, perchlorate nitrate, or the like.

The dyes may be prepared by boiling a 2-alkyl-benzoselenazole preferably 2-methylbenzoselenazole or a substituted 2-alkylbenzoselenazole with a fatty acid anhydride, adding the nitrite of an aliphatic alcohol and separating the precipitated dye.

The dyes are obtainable according to the desired solubility in form of the bromide, iodide, perchlorate etc. and are used in a quantity as usual for the known sensitizing dyes. This quantity amounts to about 15 to 30 milligrams per 1 kg. of emulsion ready for being cast which contains about 9 per cent of gelatin, 4.5 per cent of silver halide, the rest being water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast. The dyes may likewise be added by coating the emulsion with them or by bathing the finished photographic material in a bath in which the dye is dissolved. The dyes are suited for sensitizing an emulsion made according to the boiling process as well as for sensitizing an emulsion made according to the ammonia process.

The following examples serve to illustrate my invention.

*Example 1.*—For producing the dye bis-[3-ethyl-benzselenazole-(2)]-methinecyanine-iodide corresponding to the formula

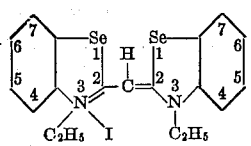

7 grams of 2-methyl-benzselenazole-ethyl-iodide are heated with 50 cc. of acetic anhydride until boiling and then there are added 3 cc. of amyl nitrite. While vehemently frothing the dye separates from the brownish-yellow colored solution in form of greenish yellow flakes. By recrystallization from alcohol the dye is obtainable as green shining needles.

The alcoholic solution of the dye shows an absorption maximum at a wave length of about 420μμ.

*Example 2.*—For producing the dye bis-[3- ethyl-5-ethoxy-benzselenazole-(2)]-methinecyanine-iodide corresponding with the formula

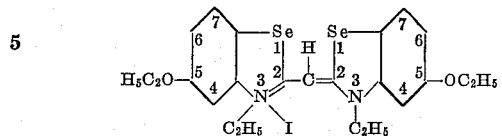

to a boiling solution of 4 grams of 2-methyl-5-ethoxy-benzselenazole-ethyl-iodide in 30 cc. of acetic anhydride there are added 1.5 cc. of ethyl nitrite. While vehemently frothing the dye separates from the solution in form of yellow flakes. The dye is obtainable in form of yellow felted needles by recrystallization from alcohol.

The alcoholic solution of the dye shows an absorption maximum at a wave length of about 440µµ.

Example 3.—The dye bis-[3-ethyl-5-chloro-benzselenazole-(2)]-methinecyanine-iodide corresponding with the formula

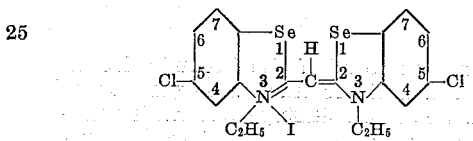

is precipitated from the boiling solution of 4 grams of 2-methyl-5-chloro-benzselenazole-ethyl-iodide in 30 cc. of acetic anhydride by addition of 2 cc. of amyl nitrite in form of greenish yellow flakes. Recrystallization of the dye from alcohol yields fine needles.

The alcoholic solution of the dye shows an absorption maximum at a wave length of about 425µµ.

Example 4.—The dye bis-[3-ethyl-6-methoxy-benzselenazole-(2)]-methinecyanine-iodide corresponding with the formula

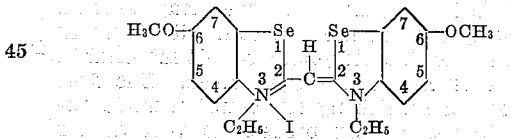

separates from a boiling solution of 4 grams of 2-methyl-6-methoxy-benzselenocyanine-iodide and 30 cc. of acetic anhydride by addition of 2 cc. of amyl nitrite in form of yellow flakes.

The alcoholic solution of the pure dye shows an absorption maximum at a wave length of about 435µµ.

Example 5.—For producing the dye bis-[3-methyl-{naphtho-1'.2':4.5-selenazole}-(2)]-methinecyanine-bromide corresponding with the formula

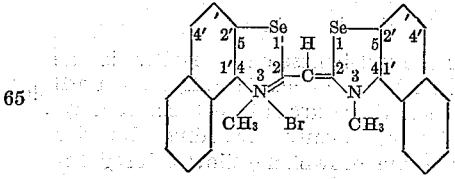

3 grams of 2-methyl-α-naphthol-selenazole-ethyl-bromide are heated with 10 cc. of acetic anhydride until boiling. The dye separates on addition of 1 cc. of amyl-nitrite from the brownish yellow colored liquid in form of small crystal druses. The filtered product is washed with acetone and ether and recrystallized from methanol.

The alcoholic solution of the dye shows an absorption maximum at a wave length of about 455µµ.

The bases serving as a starting material for the production of the dyes are obtainable according to methods known from the preparation of the unsubstituted benzselenazoles.

Example 6.—The dye bis-[3-methyl-6-acetylamino-benzselenazole-(2)]-methinecyanine-iodide corresponding with the formula

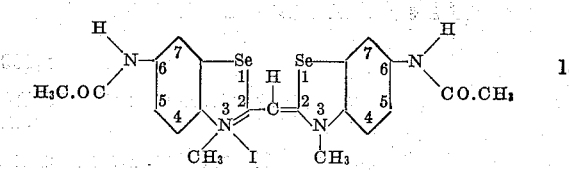

may be obtained by heating 3 grams of 2-methyl-6-acetylamino-benzoselenazole methiodide in 10 cc. of acetic anhydride to boiling and adding 1 cc. of amylnitrite. The mixture froths and assumes a brownish yellow color; the dye separates after cooling.

The alcoholic solution of the dye has an absorption maximum at a wave length of about 440µµ.

Example 7.—The dye bis-[3-methyl-6-propionylamino-benzselenazole-(2)]-methinecyanine iodide corresponding with the formula

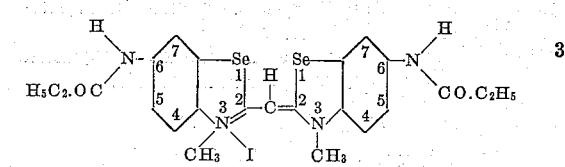

may be obtained by heating 2 grams of 2-methyl-6-propionylaminobenzoselenazole methiodide in 10 cc. of acetic anhydride to boiling and adding 1 cc. of ethylnitrite. The mixture froths and assumes a brownish yellow color; the dye separates after cooling.

The alcoholic solution of the dye has an absorption maximum at a wave length of about 440µµ.

Example 8.—The dye bis-[3-methyl-5-acetylamino-benzoselenazole-(2)]-methinecyanine iodide corresponding with the formula

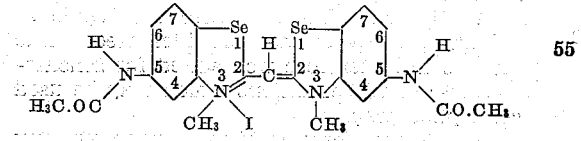

may be obtained by heating 2-methyl-5-acetylaminobenzoselenazole methiodide in 10 cc. of acetic anhydride, after the addition of 1.5 cc. of amylnitrite mixed with 3 cc. of acetic anhydride, and maintaining the whole at boiling point for about 3 minutes. After cooling the dye separates in form of yellow flakes.

The alcoholic solution of the dye has an absorption maximum at a wave length of about 468µµ.

It is to be understood that my invention is not limited to the foregoing examples nor to the specific details given therein. Numerous other embodiments are possible and I contemplate as included within my invention all such modifications and equivalents as fall within the scope of the appended claims. So, for instance, the benzene nuclei may contain one or more substituents. The nomenclature used is familiar to every chemist skilled in the art and has the advantage of clearness.

What I claim is:

1. A bis-[3-alkyl-benzselenazole-(2)]-methinecyanine salt.

2. A symmetrically substituted compound corresponding with the formula

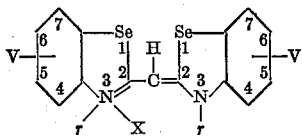

V stands for a radical selected from the group consisting of H, alkyl, alkoxy, halogen, and alkacylamino,
r=alkyl,
X stands for an anion capable of precipitating the dye.

3. A symmetrically substituted compound corresponding with the formula

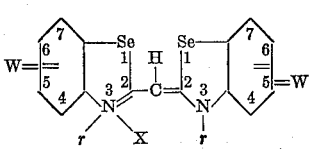

W=benzo
r=alkyl
X stands for an anion capable of precipitating the dye.

4. A bis-[3-ethyl-benzselenazole-(2)]-methinecyanine salt.

5. A bis-[3-methyl-benzselenazole-(2)]-methinecyanine salt.

6. Bis-[3-ethyl-5-ethoxy-benzselenazole-(2)]-methinecyanine iodide corresponding with the formula

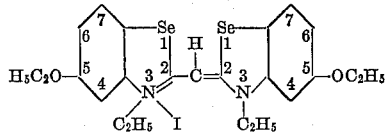

and having in its alcoholic solution an absorption maximum at a wave length of about 440μμ.

7. Bis-[3-ethyl-6-methoxy-benzselenazole-(2)]-methinecyanine iodide corresponding with the formula

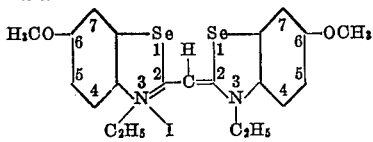

and having in its alcoholic solution an absorption maximum at a wave length of about 435μμ.

8. Bis-[3-methyl-{naphto-1'.2':4.5-selenazole}-(2)]-methinecyanine bromide corresponding with the formula

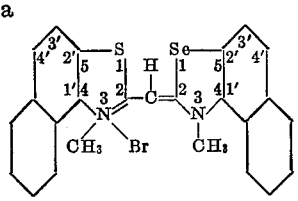

and having in its alcoholic solution an absorption maximum at a wave length of about 455μμ.

9. The process of producing a bis-[3-alkyl-benzselenazole-(2)]-methinecyanine salt which comprises boiling the mixture of a quaternary ammonium salt of a 2-methylbenzselenazole with a fatty acid anhydride, adding an alkyl nitrite and separating the formed dye.

10. The process of producing a bis-[3-alkyl-benzselenazole-(2)]-methinecyanine salt which comprises boiling the mixture of a quaternary ammonium salt of a 2-methylbenzselenazole with acetic anhydride, adding amyl nitrite and separating the formed dye.

11. The process of producing bis-[3-ethyl-5-ethoxy-benzselenazole-(2)]-methinecyanine iodide which comprises boiling a mixture of 2-methyl-5-ethoxy-benzselenazole ethiodide and acetic anhydride, adding amylnitrite, and separating the formed dye.

12. The process of producing bis-[3-ethyl-6-methoxy-benzselenazole-(2)]-methinecyanine iodide which comprises boiling a mixture of 2-methyl-6-methoxy-benzselenazole ethiodide and acetic anhydride, adding amylnitrite, and separating the formed dye.

13. The process of producing bis-[3-methyl-{naphto-1'.2':4.5-selenazole}-(2)]-methinecyanine bromide which comprises boiling a mixture of 2-methyl-[naphto-1'.2':4.5-selenazole] ethyl bromide and acetic anhydride, adding amylnitrite, and separating the formed dye.

WALTER ZEH.